Nov. 16, 1965   O. H. WENNERBERG   3,217,418
RADIUS INSPECTION AND LAYOUT DEVICE
Filed Aug. 13, 1963   7 Sheets-Sheet 1

INVENTOR.
OSCAR H. WENNERBERG
BY
McCormick, Paulding & Huber
ATTORNEYS

United States Patent Office 3,217,418
Patented Nov. 16, 1965

3,217,418
RADIUS INSPECTION AND LAYOUT DEVICE
Oscar H. Wennerberg, 46 White Ave.,
West Hartford, Conn.
Filed Aug. 13, 1963, Ser. No. 301,820
4 Claims. (Cl. 33—172)

The present invention relates to inspection and layout devices, and more particularly to a device for checking the radius of curvature of an article being inspected or for laying out such a radius on a workpiece.

A general object of the present invention is to provide a radius inspection device which permits accurate checking of the radius of a curved surface including the location of said surface with respect to any known point on the article being inspected.

Another general object of the present invention is to provide a radius locating device which permits a curved line to be accurately laid out on a workpiece at a location which can be precisely positioned with respect to any known point on said workpiece.

A still further object of the present invention is to provide a radius inspection device which permits accurate checking of any radius on a conical surface with no additional setting up being required once the article has been positioned for one such radius and the cone angle has been determined.

Still another object of the present invention is to provide a radius inspection device which does not require the article being inspected to be rotatably mounted in a lathe or other similar machine.

Still another object of the present invention is to provide a radius inspection device for checking the radius of a curved surface on an article nonrotatably supported on an inspection surface or table and which device eliminates the time consuming trigonometric calculations normally associated with inspecting such a curved surface.

Still another object of the present invention is to provide a radius inspection device which permits the checking of curved surfaces in both horizontal and vertical planes.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
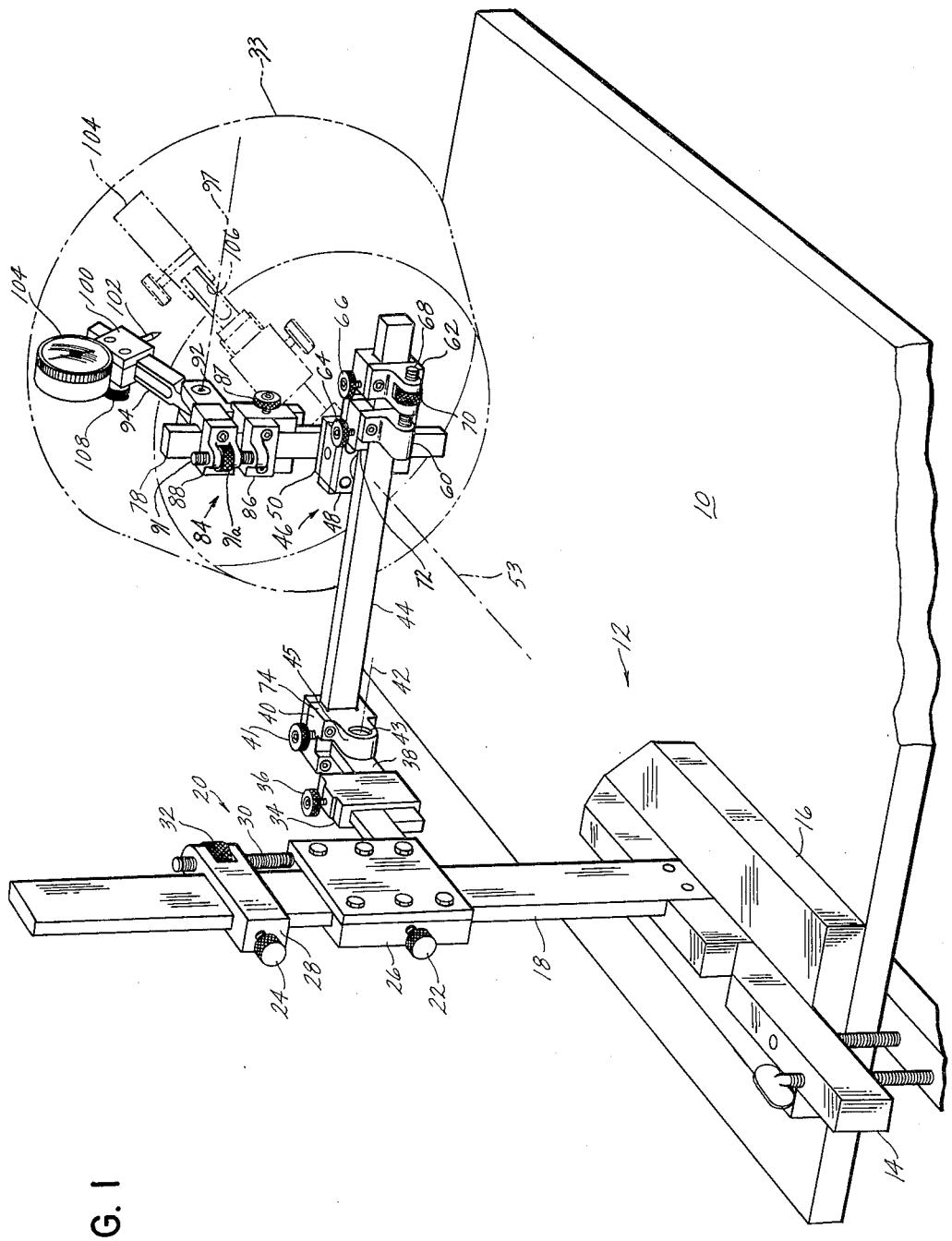
FIG. 1 is a perspective view of an inspection surface plate and a height gage showing a device embodying the present invention held by said height gage in a position for inspecting the curved surface of a conical article having a horizontal axis, the article being shown in broken lines and the movable portion of the device also being shown in an alternative position in broken lines.

Referring now to the drawings, FIGS. 1, 2, 5, 6, 7 and 8 show an inspection surface or table 10 of the type normally used for inspecting articles. A standard vertical height gage 12 is shown clamped to this surface by a clamp 14. The height gage is of well known construction and comprises a base 16, a vertical post 18 and an adjustable slide block 20 which can be clamped to the post by the knurled thumb screws 22 and 24. This slide block is in two parts 26 and 28 which are joined by a screw 30 and knurled nut 32 arrangement so as to permit fine adjustments of the lower part 26 with respect to the upper part 28. The lower part 26 is provided with an integral bit or socket 34 which has a thumb screw 36 for receiving and holding the rectangular arm of an inspection device or the like.

Figure 2:
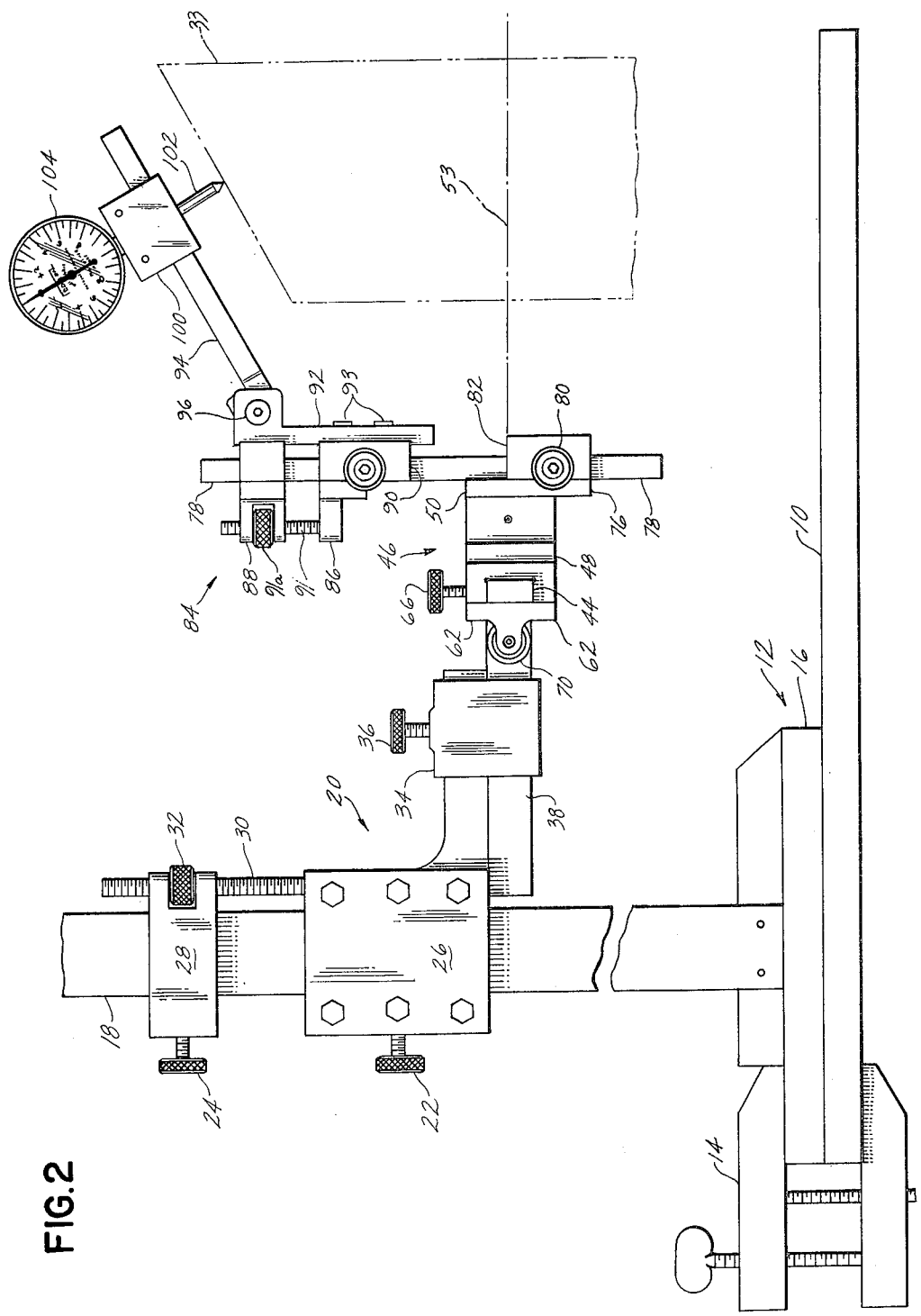
FIG. 2 is a side elevational view of the FIG. 1 device, this view showing the parts of the device in the same positions as occupied in FIG. 1.
Figure 3:
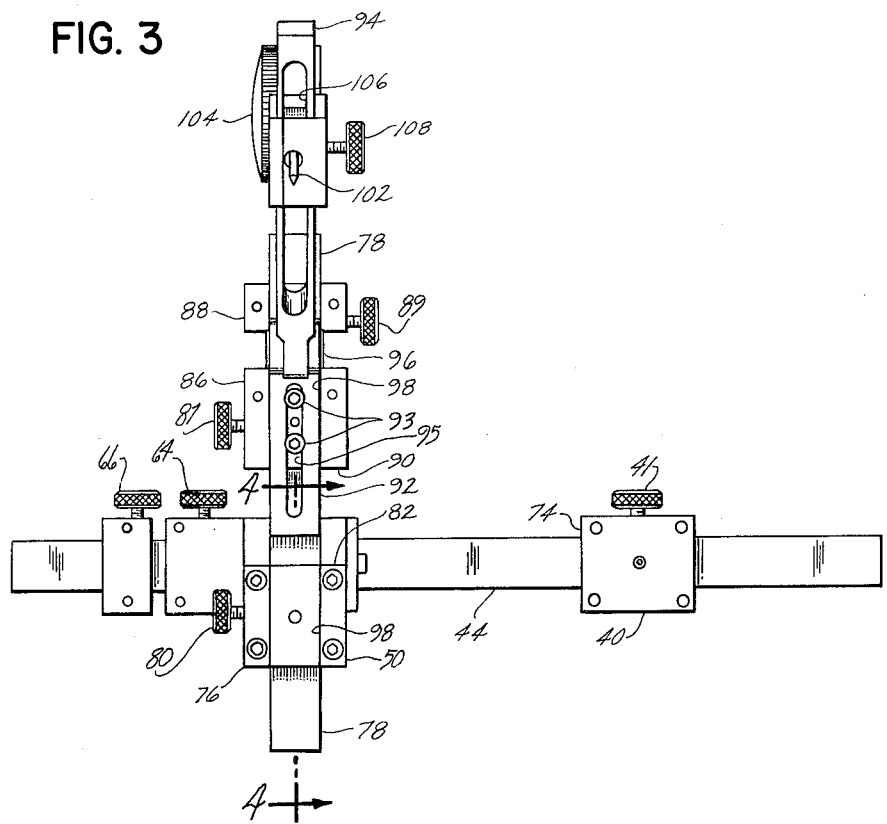
FIG. 3 is an elevational view of the FIG. 1 device taken looking toward the left in FIG. 2, the height gage having been omitted for clarity.

Turning now more particularly to FIGS. 1, 2 and 3, these figures show a device embodying the present invention arranged for checking radii on the surface of a conical article 33 having its axis arranged horizontally. As best shown in FIGS. 1 and 2, the device includes a short first arm 38 which is releasably attached to the height gage socket 34 so as to extend horizontally therefrom in perpendicular relation to the vertical post 18. A first block 40 is connected to the outboard end of the arm 38 and is rotatable with respect thereto about a horizontal axis 42 which is perpendicular to the arm 38. To provide for this connection, the arm 38 is received between two spaced arms 45, 45 of the block 40, and a headed screw 43 is passed loosely through one arm 45 and the arm 38 and threadably received in the other arm 45. As so constructed the block 40 can be rotated from the FIG. 1 position to that shown in FIGS. 5 and 6, for reasons to be discussed hereinbelow, and can be clamped in either position by tightening the screw 43.

The block 40 includes a horizontally extending socket or opening of rectangular cross section which passes completely through the block and has its longitudinal axis arranged parallel with the axis 42. A first beam 44 of rectangular cross section is slidably received in said latter socket of the block 40 and extends perpendicularly from the arm 38 in a horizontal direction as shown. A thumbscrew 41 is provided in the first block 40 to releasably clamp the beam 44 in a fixed position relative to the block.

Figure 4:
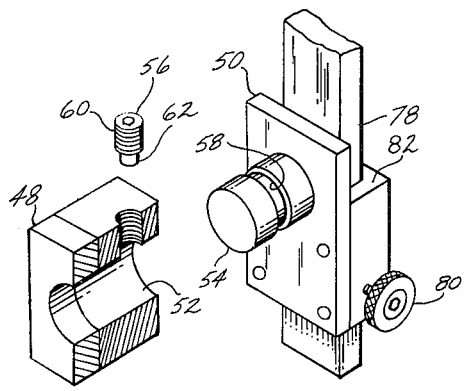
FIG. 4 is an exploded perspective view of the pivotable slide block employed in the device of FIG. 1, with part of the view being taken in section along the line 4—4 of FIG. 3.

A pivotable slide block assembly, indicated generally at 46 in FIG. 1, is slidably received on the first beam 44. This assembly includes one member 48 which is slidably adjustable along the length of the beam 44 and another member 50 which is pivotally connected to the member 48 for rotation about an axis 53 which is perpendicular to the beam 44 and which is orientated horizontally when the block 40 is in the position illustrated in FIGS. 1, 2 and 3. FIG. 4 illustrates in detail the construction of the pivotal connection. The member 48, which is adjustably fixed to the first beam 44, includes a cylindrical bore 52 in which a journal 54 fixed relative to the member 50 is free to rotate. In order to prevent the journal 54 from slipping out of the bore 52, a set screw 56 is provided in the member 48 and an annular groove 58 is provided in the journal 54. The set screw has a threaded portion 60 which is threadably received in the member 48 and an unthreaded portion 62 of reduced diameter which is received in the annular groove 58. Engagement of the unthreaded portion 68 with the two radial walls of the groove 58 fixes the journal against axial movement relative to the member 48 while nevertheless permitting relative rotational movement.

As mentioned, the member 48 is adjustable along the length of the beam 44. To permit both coarse and fine adjustment of the axis 53, the member 48 includes two separate parts 60 and 62 which can be individually clamped to the beam 44 by separate thumbscrews 64 and 66. By loosening both thumbscrews 64 and 66 both of the parts 60 and 62 may be slidably moved along the length of the beam 44 to effect a coarse adjustment. By loosening the thumbscrew 64 and tightening the thumbscrew 66, the part 62 may be fixed to the beam 44 and the part 60 moved relative to the part 62 and to the beam 44 to effect a fine adjustment by rotating the nut 70. The axis 53 is fixed relative to the part 60 and therefore the movement of this part relative to the beam produces a corresponding movement of the axis 53.

The position of the axis 53 relative to the beam may be determined by measuring the displacement of the member 48 from the block 40. To aid in making this measurement, the part 60 of the member 48 includes an accurately machined flat gage surface 72 which is perpendicular to the beam 44 and which faces the block 40. The block 40 includes a similar flat gage surface 74 which is also perpendicular to the beam 44 and which faces the surface 72. One or more standard gage blocks (not shown) may therefore be placed between these surfaces to measure the location of the axis 53 or to position the same at a desired location along the beam 44. In this connection it should be noted that the part 60 is constructed with an offset, as shown best in FIG. 1, so that the portion thereof which receives the journal 54 is spaced from the beam 44. This allows the axis 53 to be brought into alignment with the axis of the arm 38 and when the two latter axes are so aligned the two gage surfaces 72 and 74 engage one another.

As best shown in FIG. 2, a second adjustable slide block assembly 84 is received on the upper end of the second beam 78 and comprises two separate parts 86 and 88 both of which are slidable relative to the beam 78. The part 86 is releasably fixed relative to the beam by a thumbscrew 87 and the part 88 is similarly releasably fixed relative to the beam by another thumbscrew 89. The two parts 86 and 88 are joined by a screw 91 and knurled nut 91a arrangement which permits the parts to be moved relative to each other for the purpose of making a fine adjustment of the part 86 relative to the beam. The lowermost part 86 has an accurately machined flat gage surface 90 which faces the gage surface 82. Both of the gage surfaces 82 and 90 are perpendicular to the beam 78 and therefore the part 86 may be very accurately located along the second beam 78 by the use of gage blocks or other measuring means inserted between the gage surfaces in a manner similar to that discussed above in connection with the positioning of part 60 along the first beam 44. The part 86 can accordingly be accurately located both horizontally and vertically, as well as rotated about the pivot axis 53. Furthermore, the plane of the gage surface 82 is so located as to contain the pivot axis 53, and therefore if the point of the indicator plunger is positioned so as to fall on the axis 53 when the gage surfaces 82 and 90 are in coengagement, the spacing between the latter gage surfaces will directly represent the radius of the path through which said plunger point is moved.

A bracket 92 is adjustably secured to the part 86 by two screws 93, 93 which pass through an elongated slot 95 in the bracket and which are threadably received in the part 86. By loosening and tightening the screws 93, 93 the bracket may be shifted to various different positions relative to the part 86. The part 86 and the part 88 also both include a shallow groove for receiving a portion of the bracket and a similar groove, shown at 98 in FIG. 3, is provided in the member 50 for accommodating the bracket when the slide block 84 is positioned close to the slide block 46. A second arm 94 is pivotally connected to the bracket for movement relative to the bracket about an axis 97 perpendicular to the beam 78. A pivot pin 96 is used to provide the pivotal connection and may be loosened and tightened to adjustably hold the arm in a given angular position relative to the bracket.

A block 100 is slidably received on the arm 94 and supports a dial indicator 104 having a plunger 102 which extends through the block and the arm as shown best in FIGS. 2 and 3. An elongated slot 106 is provided in the arm 94 to receive the plunger with the plunger being located in a plane passing through the axis 53.

The block 100 includes a socket or opening which slidably receives the arm 94 and a thumbscrew 108 is provided for clamping the block at any selected location along the arm. The angle which the arm 94 defines with respect to the surface 10 can be accurately set or measured by the use of a sine bar (not shown) and once said arm is so set a conical surface can be readily inspected throughout its entire extent by sliding the block 100 along arm 94 and rotating the beam 78 about the pivot axis 53. Before checking such a conical surface, however, it will be understood that the axis 53 must be brought into colinear relationship with the axis of the cone. This can be done in various different ways. For example, assume that the cone axis is horizontal and that from a blue print or other specification the height of the axis from the surface 10 and its horizontal displacement from a given reference point or vertical surface is known. Also assume that the blueprint shows the cone angle and the radius of the cone at its smaller end. The arm 94 is first adjusted about the axis 97, by the use of sine bars or other means, to the given cone angle relative to the beam 78. The device is then placed in generally the position shown in FIG. 1 and by use of a measuring device the height gage slide block 20 is adjusted to bring the gage surface 82 to the same elevation as the cone axis. The slide block assembly 84 is then adjusted along the beam until the gage surface 90 engages the cooperating gage surface 82 and is temporarily clamped in this position. The location of the end of the dial indicator plunger is next determined. Preferably, this is accomplished by loosening the screws 93, 93 and shifting the bracket until the end of the plunger engages a horizontal gage surface placed at the elevation of the axis 53 and, while the plunger is in such engagement, zeroing the dial of the indicator. If this is done, it will be noted that thereafter whenever the dial indicator reads zero the spacing between the gage surfaces 82 and 90 will be exactly equal to the radius of the path through which the plunger point is moved. In some instances, however, the plunger may be too short or the indicator located too far out on the arm 94 to allow the plunger point to be brought into coincidence with the axis 53. In these cases, the displacement of the plunger point from the axis 53 is measured, while the surfaces 82 and 90 are in coengagement, and thereafter added to the measurement of the spacing between the latter gage surfaces to determine the radius of the path travelled by the plunger point.

The axis 53 is next horizontally located relative to the given reference point or surface. This may be done in various ways, but, for example, assume that the reference is a vertical plane parallel to the cone axis, that the gage surfaces 82 and 90 are still in coengagement and that the indicator has been set to read zero when its end is on the axis 53. The beam 78 may therefore be swung from the vertical position of FIG. 1, and about the axis 53, to a horizontal position parallel to the beam 44. The slide block 46 is then adjusted along the beam 44 until the plunger engages the reference surface and the indicator reads zero and when this condition occurs the axis 53 is aligned with the reference surface. By the use of gage blocks or other measuring means, the slide block 46 may thereafter be moved and the exact desired distance horizontally from the reference surface to bring the axis 53 into alignment with the cone axis.

The inspection process is then accomplished by adjusting the slide block 84 along the beam 78 to displace the plunger end from the axis 53 by an amount equal to the radius of the small end of the cone. The beam is then swung about the axis 53 with its plunger engaging the small end of the cone and the dial indicator observed. If the indicator reads zero at all positions of the beam 78, the cone axis is properly located and the small end of the cone has the proper radius. Other checks may then be made by moving the indicator along the length of the arm 94.

After the pivot axis is once aligned with one axis or reference point on the workpiece, it may readily be moved into alignment with or used to check the location of other axes by adjusting the beam vertically through movement of the height gage slide block 20, by adjusting the slide block 46 horizontally on the beam 44, and by adjusting the slide block 84 on the beam 78 to suit the radius of the surface associated with the axis in question, the latter two adjustments being made through the use of gage blocks placed between the cooperating gage surfaces 72 and 74 and 82 and 90.

It will be apparent to one skilled in the art that the structure described above can be put to other advantageous uses. Obviously the device could be used for checking cylindrical curved surfaces, and for this use the angular orientation of the arm 94 relative to the beam 78 is not important and the arm may be clamped in any position, preferably at right angles to the beam 78. The most typical use of the device is to check the radii of a number of curved surfaces in a single part, the location of the centers or curvatures of which surfaces are known from a blueprint or other design information. In this case the axis 53 of the device is first aligned with the center of curvature of one surface and then the locations of the centers of the other surfaces are checked by positioning the slide blocks of the device through the use of gage blocks to bring the axis 53 successively into alignment with the intended locations of said other centers and swinging the beam 78 about the axis 53 in each instance. A constant reading on the gage 104 indicates that the axis under inspection is properly located relative to the reference axis and that the associated surface is truly cylindrical. A nonconstant reading on the gage indicates either an error in the location of the axis or an out-of-round condition of the surface. Before marking any reading the slide block 84 is adjusted, if necessary, to position the indicator plunger at a distance from the axis 53 equal to the radius of the surface to be checked.

Figure 5:
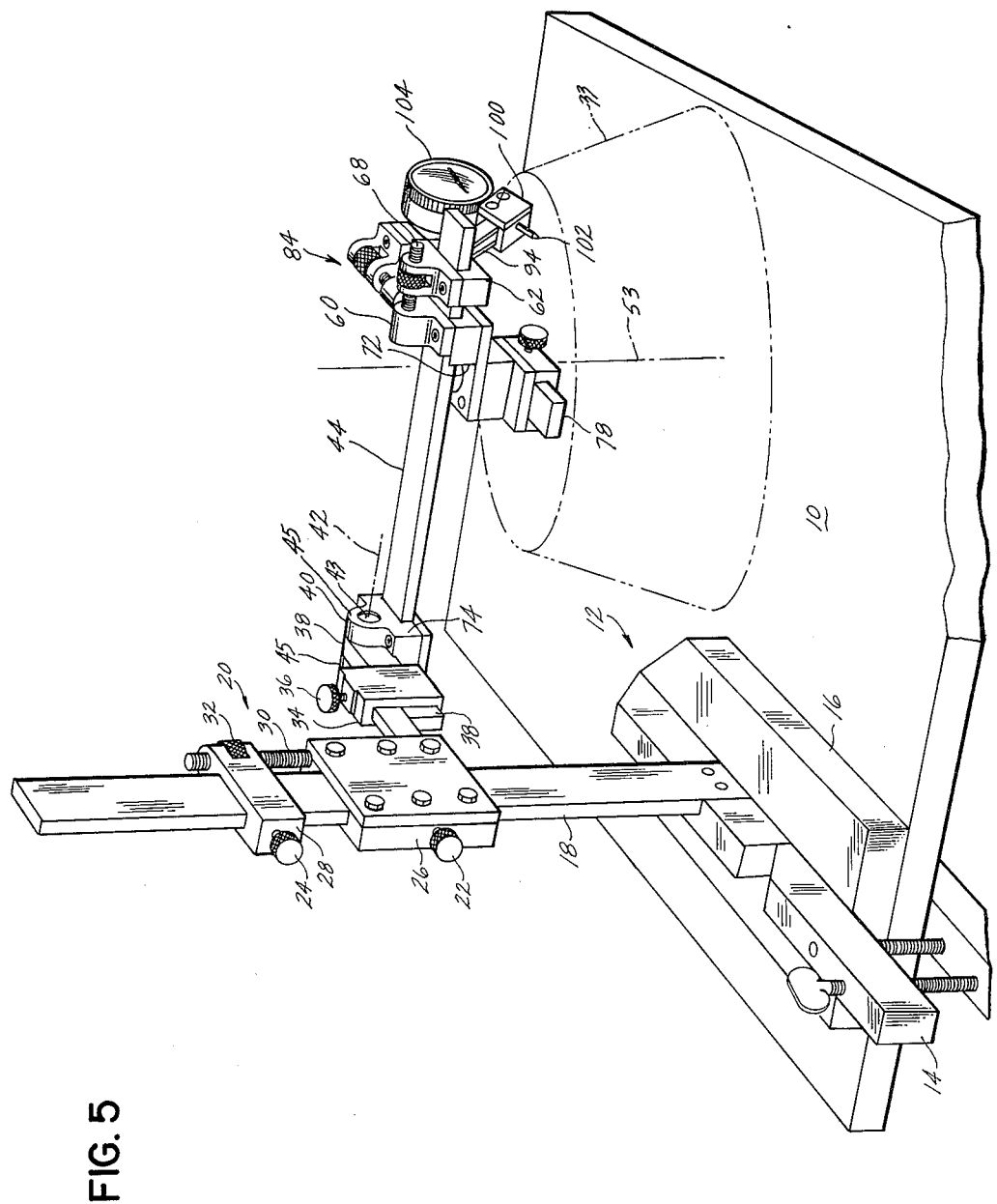
FIG. 5 is a perspective view of the FIG. 1 device illustrating the device arranged for checking the curved surface of a conical article having a vertical axis.
Figure 6:
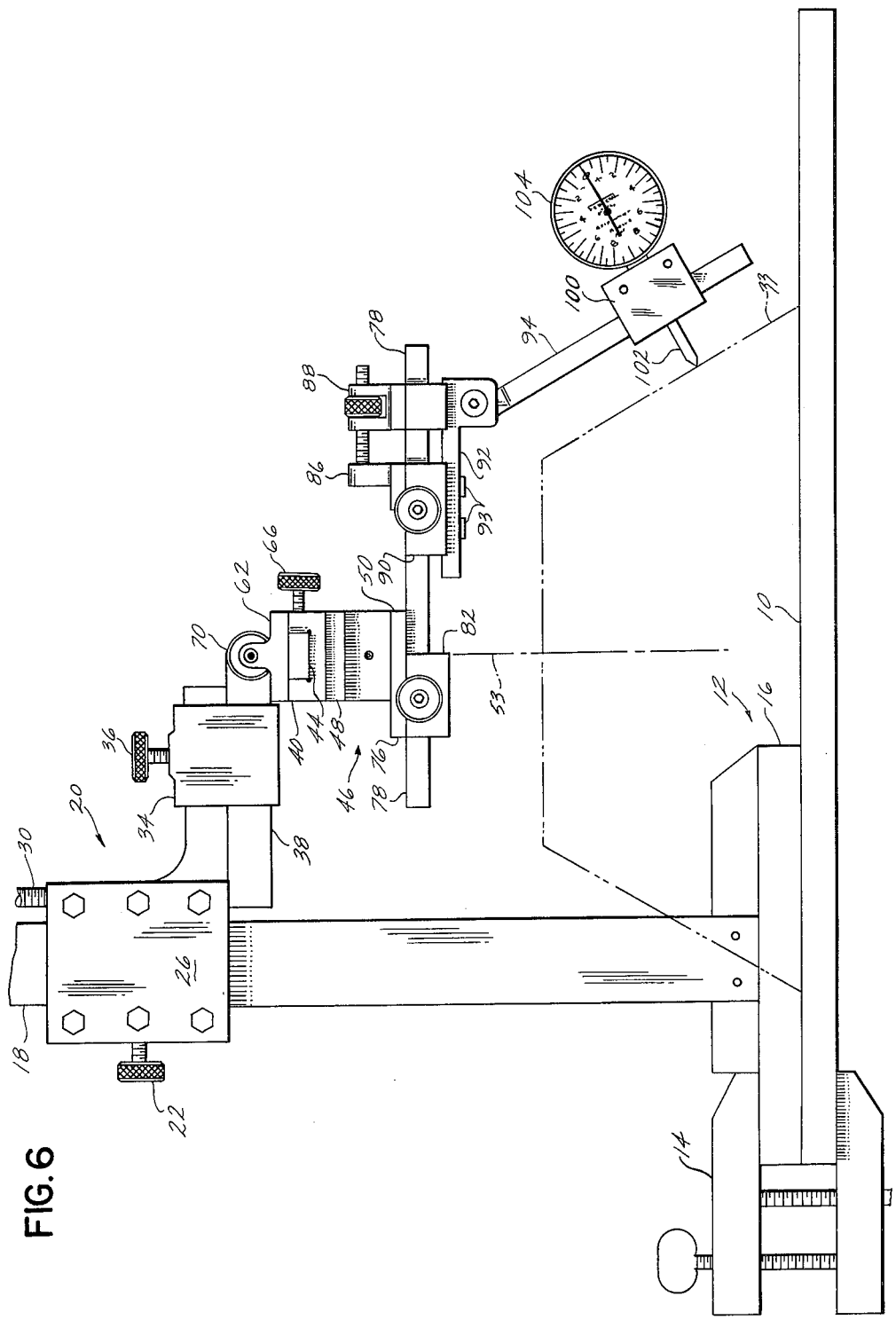
FIG. 6 is a side elevational view of the FIG. 1 device with the parts thereof arranged as shown in FIG. 3.

It will also be apparent that the subject device described above is not limited to checking horizontally arranged conical surfaces as shown in FIGS. 1 and 2. As shown in FIGS. 5 and 6, a conical surface oriented with its axis of revolution vertically can also be inspected in the same manner as outlined hereinabove by rotating the block 40 about the axis 42 to bring it to the position shown in FIGS. 5 and 6. In addition to being rotatable 90° in one direction from the FIG. 1 position to the FIG. 5 position, the block 40 is also rotatable 90° in the other direction from the FIG. 5 position and may be clamped in any position intermediate the limits of its movement. Therefore, by proper adjustment of the block 40 the device may be used to check any surface of revolution having an axis inclined relative to the plane of the inspection surface 10.

Figure 7:
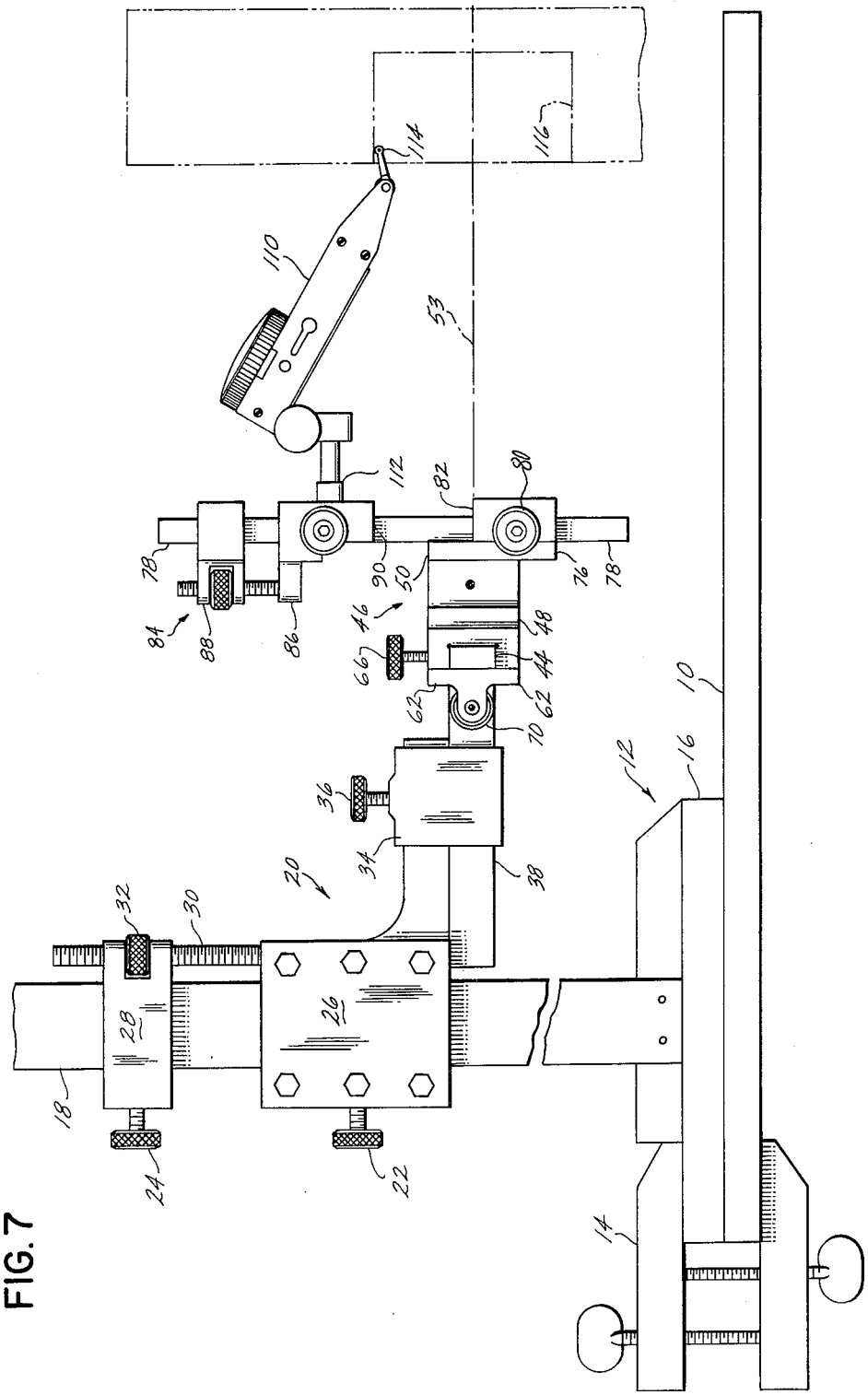
FIG. 7 is a side elevational view of a device comprising an alternative embodiment of the invention peculiarly suited to checking smaller radii.

Referring now to FIG. 7 an alternative embodiment of the present invention is there shown which is peculiarly suited to inspecting the contour of surfaces of small radii and internal surfaces. The inspection device shown in this figure is identical with that shown in FIGS. 1 to 6, except that the bracket 92 and its associated parts are removed from the part 86 and replaced by an indicator 110 of the type having a fixed beam and a small pivotally mounted probe 114 at the free end of its beam, said indicator being mounted on an L-shaped bracket 112 which is rigidly attached to the part 86. The probe 114 of said gage 110 can therefore be rotated about the pivot axis 53 by swinging the beam 78 relative to the beam 44. The beam type gage 110 is particularly useful in checking small diameter surfaces and internal surfaces such as the surface of the hole 116, a measurement which would be inaccessible to the device of FIG. 2.

Figure 8:
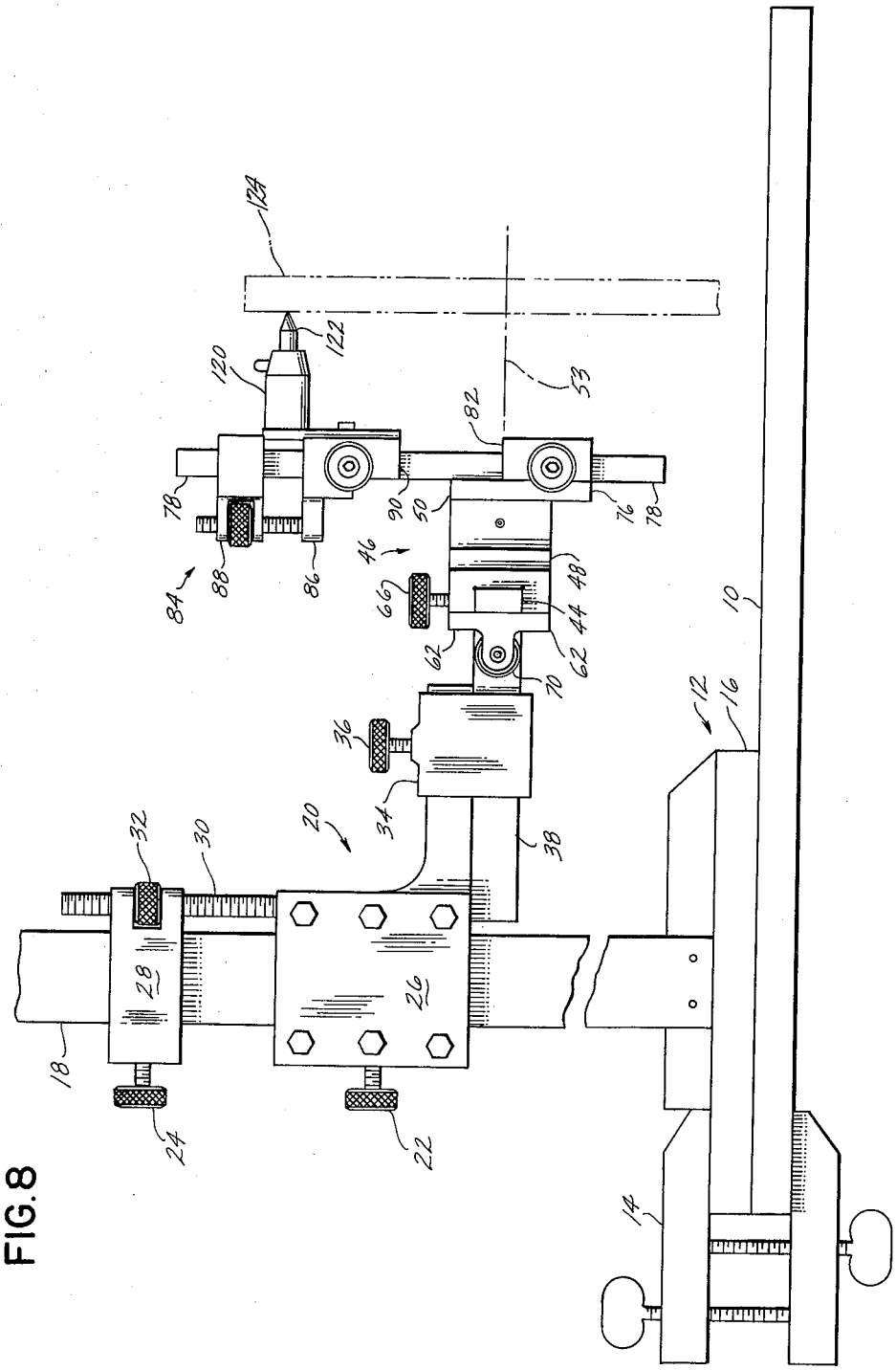
FIG. 8 is a side elevational view of a device comprising still another embodiment of the invention and which device is adapted for use in laying out radii on a workpiece.

A third embodiment of the invention is shown in FIG. 8. Referring to this figure, the device there shown is identical with that shown in FIGS. 1 to 6 except for its being adapted for use in laying out curved surfaces on a workpiece by the bracket 92 and its associated parts being removed from the part 86 and replaced by a scribe 120. The scribe 120 includes a point 122 which is preferably spring biased outwardly toward a workpiece 124. The scribe 120 can therefore be rotated about the axis 53 to mark a curved line on the workpiece 124 after the axis 53 has been properly located and after the part 86 has been properly positioned on the beam 78 to provide the desired radial length. Thus the present invention is capable of locating circular arcs on a workpiece in a very accurate fashion.

With reference to the short arm 38 and its associated rotatable block 40, these members lend a flexibility to the above described embodiments which may not be required in every application of the present invention. For instance, where the circular arcs to be inspected all have their axes orientated horizontally, the arm 38 and block 40 can be dispensed with and the first beam 44 inserted directly into the height gage bit 24. It should also be noted the use of the thumbscrew 41 for releasably fixing the beam 44 to the block 40, as well as the use of the thumbscrews 64 and 66 for releasably fixing the slide block 46 to the beam, permits the illustrated beam 44 to be readily removed from the device and replaced by a shorter or longer beam. Similarly, the use of the thumbscrew 80 to releasably fix the beam 70 to the block 46, as well as the use of the thumbscrews 87 and 87 to releasably fix the block 84 to the beam 78, permits the illustrated beam 44 to be readily removed from the device and replaced by a shorter or longer beam.

The invention claimed is:

1. A device for inspecting or laying out a curved surface on a workpiece, said device comprising a first beam adapted to be supported at one point along its length relative to a workpiece such as aforesaid, a first slide block assembly including a first part received on said first beam for slidable adjustment longitudinally of said beam and a second part rotatable relative to said first part about an axis extending perpendicular to said first beam, a second beam fixed to said second part of said slide block assembly and extending outwardly therefrom radially of said axis, a second slide block assembly received on said second beam for slidable adjustment longitudinally of said second beam, and a tool carried by said second slide block assembly and adapted for engagement with said workpiece as said second beam is rotated about said axis relative to said first beam, said second part of said first slide block assembly and said second slide block assembly each including a flat gage surface extending perpendicular to said second beam and facing the other gage surface.

2. A device for inspecting a curved surface on a workpiece, said device comprising a first beam adapted to be supported at one point along its length relative to a workpiece such as aforesaid, a first slide block assembly including a first part received on said first beam for slidable adjustment longitudinally of said beam and a second part rotatable relative to said first part about an axis extending perpendicular to said first beam, a second beam fixed to said second part of said slide block assembly and extending outwardly therefrom radially of said axis, a second slide block assembly received on said second beam for slidable adjustment longitudinally of said second beam, an indicator carried by said second slide block assembly and adapted for engagement with a curved surface on said workpiece as said second beam is rotated about said axis relative to said first beam, an arm connected with said second slide block assembly and adjustable to various different angular positions relative to said second slide block assembly about an axis perpendicular to said second beam and in a plane parallel to said first beam, and means mounting said indicator on said latter arm for adjustment of said indicator to various different positions along the length of said arm.

3. A radius inspection or layout device adapted for attachment to a standard height gage of the type including a vertical post and a bit adjustable along the length of said post, said device comprising a first arm adapted to being received and held by said bit so as to extend horizontally from said post, a first block rotatably connected to the outer end of said first arm for movement of said block relative to said arm about a horizontal pivot axis, a first beam carried by said first block and arranged parallel to said pivot axis, a first slide block assembly including a first part received on said first beam for slidable adjustment longitudinally of said beam and a second part rotatable relative to said first part about an axis extending perpendicular to said first beam, a second beam carried by said second part of said slide block assembly and extending outwardly therefrom radially of said axis, a second slide block assembly received on said second beam for slidable adjustment along the length thereof, and a tool carried by said second slide block assembly and adapted for engagement with a workpiece as said second beam is rotated about said axis relative to said first beam.

4. A radius inspection device for attachment to a standard height gage of the type including a vertical post and a bit movable along the length of said post, said device comprising a first arm adapted to being received and held by said bit so as to extend horizontally from said post, a first block rotatably connected to the outer end of said first arm for movement of said block relative to said arm about a horizontal pivot axis, a first beam carried by said first block and arranged parallel to said pivot axis, a first slide block assembly including a first part received on said first beam for slidable adjustment longitudinally of said beam and a second part rotatable relative to said first part about an axis extending perpendicular to said first beam, a second beam carried by said second part of said slide block assembly and extending outwardly therefrom radially of said axis, a second slide block assembly received on said second beam for slidable adjustment along the length thereof, an arm connected with said second slide block assembly and adjustable to various different angular positions relative to said second slide block assembly about an axis perpendicular to said second beam and in a plane parallel to said first beam, and means mounting said indicator on said latter arm for adjustment of said indicator to various different positions along the length of said arm.

References Cited by the Examiner
UNITED STATES PATENTS 2,095,059 10/1937 Donnelly _____ 33—174
2,177,921 10/1939 Zofrey.
3,069,778 12/1962 Schiler _____ 33—169 X

FOREIGN PATENTS 881,002 1/1943 France.

ISAAC LISANN, *Primary Examiner.*